United States Patent
See et al.

(10) Patent No.: US 6,466,591 B1
(45) Date of Patent: Oct. 15, 2002

(54) METHOD AND APPARATUS FOR PROCESSING OF MULTIPLE PROTOCOLS WITHIN DATA AND CONTROL CHANNELS IN DATA TRANSMISSION SIGNALS

(75) Inventors: Ricky See, Milpitas, CA (US); Felix Chow, San Jose, CA (US); Sharath Narahara, Pleasanton, CA (US)

(73) Assignee: Redback Networks Inc., San Jose, CA (US)

( * ) Notice: Subject to any disclaimer, the term of this patent is extended or adjusted under 35 U.S.C. 154(b) by 41 days.

(21) Appl. No.: 09/751,584

(22) Filed: Dec. 30, 2000

(51) Int. Cl.$^7$ .................................................. H04J 3/04
(52) U.S. Cl. ........................................ 370/535; 370/536
(58) Field of Search ................................ 370/535, 536, 370/537, 538, 539, 540, 541–544, 465, 469, 252; 709/217, 219, 224, 230; 710/105

(56) References Cited

U.S. PATENT DOCUMENTS

| | | | |
|---|---|---|---|
| 4,667,324 A | | 5/1987 | Graves |
| 4,736,363 A | | 4/1988 | Aubin et al. |
| 5,159,595 A | | 10/1992 | Flanagan et al. |
| 5,608,733 A | | 3/1997 | Vallee et al. |
| 5,805,571 A | * | 9/1998 | Zwan et al. ............. 370/249 |
| 5,930,706 A | * | 7/1999 | Raith ........................ 455/422 |
| 6,134,229 A | * | 10/2000 | Schwaller et al. .......... 370/336 |
| 6,185,635 B1 | * | 2/2001 | O'Loughlin et al. .......... 710/31 |
| 6,205,142 B1 | | 3/2001 | Vallee |
| 6,237,029 B1 | * | 5/2001 | Master et al. ............... 709/217 |
| 6,285,673 B1 | * | 9/2001 | Blackburn et al. .......... 370/360 |
| 6,320,877 B1 | * | 11/2001 | Humphrey et al. ......... 370/474 |
| 6,330,251 B1 | * | 12/2001 | O'Loughlin et al. ....... 370/476 |

OTHER PUBLICATIONS

P.K. JHA, "Bandwidth Maximization for SONET/SDH and Direct Data over Optical Networks," http://www.isoc.org/inet2000/cdproceedings/1g/1g_3.htm, pp. 1–26, Nov. 16, 2000.

* cited by examiner

Primary Examiner—Ajit Patel
(74) Attorney, Agent, or Firm—Blakely Sokoloff Taylor & Zafman

(57) ABSTRACT

A method and apparatus for processing data packets of differing protocols across different data channels and control channels within signals are described. In an embodiment, a method includes receiving at least one data signal, wherein the at least one data signal includes a number of channels. The number of channels includes data channels and control channels, such that each of the data channels can include different protocols and different configurations for the different protocols and such that the control channels includes control data for controlling the at least one data signal. Additionally, the method includes processing data packets in each of the number of channels in a predefined order.

40 Claims, 8 Drawing Sheets

| STS1-9 | STS10-11 | STS12-21 | STS22-23 | STS24-35 | STS36-37 | STS38-44 | STS45-46 | STS47-48 |
|---|---|---|---|---|---|---|---|---|
| 802 | 804 | 806 | 808 | 810 | 812 | 812 | 812 | 818 |

FIG. 8

METHOD AND APPARATUS FOR PROCESSING OF MULTIPLE PROTOCOLS WITHIN DATA AND CONTROL CHANNELS IN DATA TRANSMISSION SIGNALS

FIELD OF THE INVENTION

The invention relates to the field of telecommunications. More specifically, the invention relates to network elements that can process data of different protocols within data transmission signals.

BACKGROUND OF THE INVENTION

With the advent of the Internet and the World Wide Web (WWW), the need for high-speed transmission of data including video and audio has continued to increase. Moreover, in addition to the demand for higher bandwidth, there has also been an increased need for various types of services that employ different protocols. For example, certain customers of high-speed networks may want to employ a High Level Data Link Control (HDLC) protocol, while other customers may want to employ various types of an Asynchronous Transfer Mode (ATM) protocol. Additionally, other types of protocols that customers may desire include a voice over Internet Protocol (IP) protocol.

Network elements are used to route or switch data of these different protocols across such high-speed networks. Examples of the types of data signals that can be transmitted and received by these network elements include Digital Signal (DS)-1 and DS-3 signals, which include a number of channels. Examples of other types of data signals that can be transmitted and received by these network elements signals based on the Synchronous Optical Network (SONET) standard or Synchronous Digital Hierarchy (SDH) standard. Moreover, these network elements typically include a number of line cards that include a number of ports to receive and transmit these data from. In order to accommodate the different protocol types, conventional network elements are designed and provisioned such that a given port on a given line card processes data of a particular protocol. In other words, a particular port to tied to a particular type of protocol. Disadvantageously, this limitation precludes the handling of data of different types of protocols for a given port of a network element.

SUMMARY OF THE INVENTION

A method and apparatus for processing data packets of differing protocols across different data channels and control channels within signals are described. In an embodiment, a method includes receiving at least one data signal, wherein the at least one data signal includes a number of channels. The number of channels includes data channels and control channels, such that each of the data channels can include different protocols and different configurations for the different protocols and such that the control channels includes control data for controlling the at least one data signal. Additionally, the method includes processing data packets in each of the number of channels in a predefined order.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures. In the drawings:

FIG. 8 is a block diagram of a SONET signal carrying data, according to embodiments of the present invention.

DETAILED DESCRIPTION

A method and apparatus for processing data packets of differing protocols across different data channels and control channels within signals are described. In the following description, for purposes of explanation, numerous specific details are set forth in order to provide a thorough understanding of the present invention. It will be evident, however, to one skilled in the art that the present invention may be practiced without these specific details.

System Description

Figure 1:
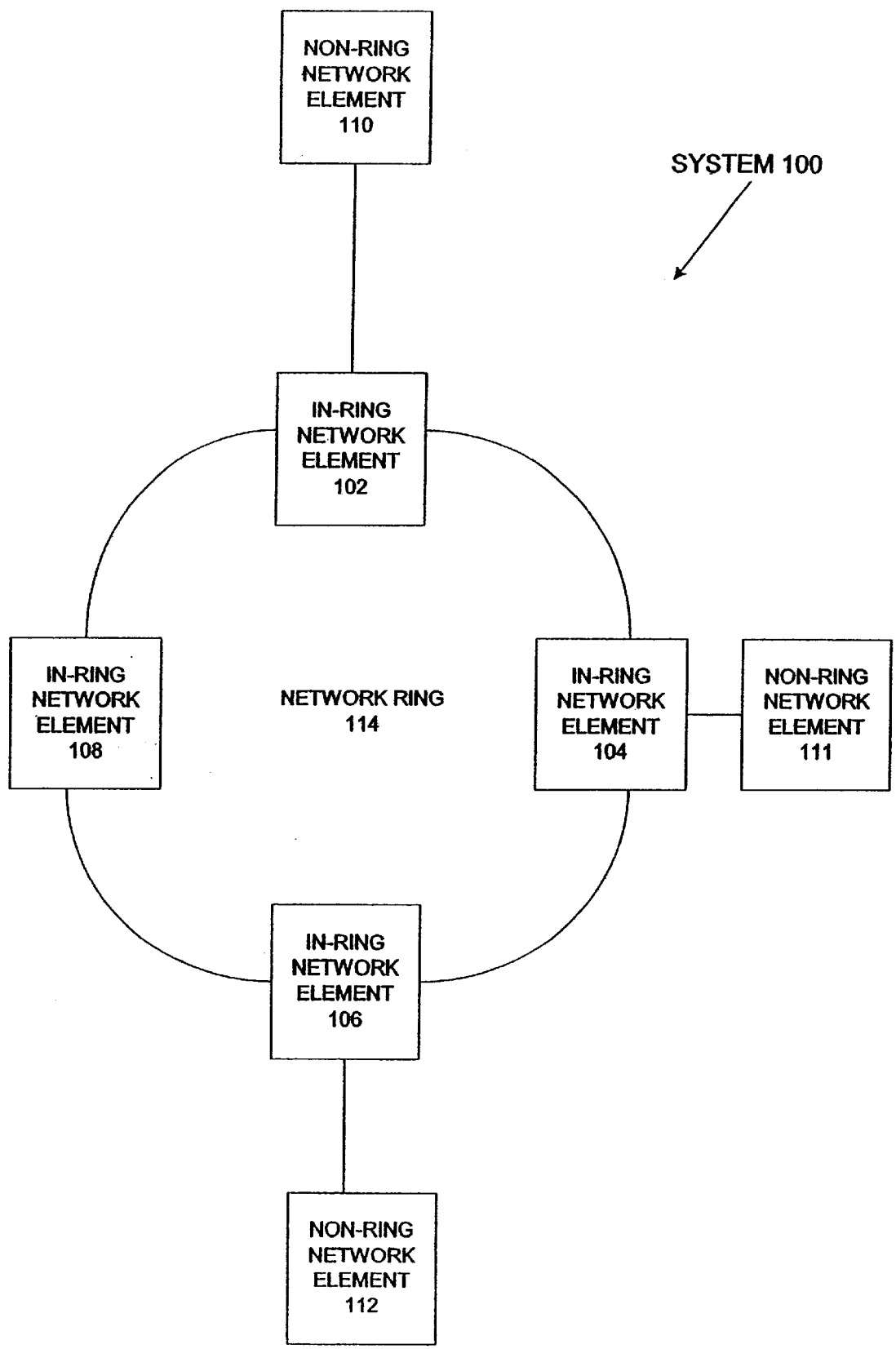
FIG. 1 is block diagram illustrating a system that incorporates embodiments of the present invention.

FIG. 1 is block diagram illustrating a system that incorporates embodiments of the present invention. In particular, FIG. 1 illustrates system 100 that includes network ring 114, which is comprised of in-ring network element 102, in-ring network element 104, in-ring network element 106 and in-ring network element 108. System 100 also include non-ring network element 110, non-ring element 111 and non-ring network element 112, which are coupled to network ring 114 through in-ring network element 102, in-ring network element 104 and in-ring network element 106, respectively. In an embodiment, non-ring elements 110–112 can be routers, switches, bridges or other types of network element that switch data across a network.

In one embodiment, the connection among in-ring network element 102, in-ring network element 104, in-ring network element 106 and in-ring network element 108 allow for bi-directional traffic. Accordingly, this bi-directional capability allows for redundancy in the communication between the different network elements, such that if a given line of communication is lost, the data traffic to be transmitted thereon can be rerouted in the opposite direction to reach its intended destination within the ring architecture.

In an embodiment, system 100 transmits data traffic among the different network elements, both in-ring and non-ring, employing the Synchronous Optical Network (SONET) standard or Synchronous Digital Hierarchy (SDH). However, embodiments of the present invention are not so limited, as data traffic among the different network elements can be transferred using other types of transmission standards. Examples of other types of transmission standards can include, but are not limited to, T1, T3, Data Signal (DS)3 and DS1 signals. In one embodiment, data traffic among in-ring network element 102, in-ring network element 104, in-ring network element 106 and in-ring network element 108 includes TDM traffic and packet traffic within a same Time Division Multiplexing (TDM) signal.

In this ring network, network elements are used that can transmit and receive TDM ring traffic. In addition, at least certain of the network elements provide two different switching techniques—TDM and packet. The packet switching provided can support any number of protocols including layer 2 and layer 3 type protocols such as ATM, Ethernet, Frame Relay, etc. In addition to typical operations of a TDM network element, the network elements are implemented to be able to: 1) programmably select on an STS basis certain of the incoming TDM traffic to be extracted and packet switched rather than TDM switched; and/or 2) receive packet traffic in another form and to be packet switched. Regardless of which switching technique is used, the switched traffic going back onto the ring is put in TDM format and transmitted out. However, each time traffic is packet switched, that traffic can be statistically multiplexed (e.g., the packets can be selectively dropped based on various criteria). A further description of the operation of system 100 and the network elements therein is described in more detail below.

The architecture and configuration of system 100 is by way of example and not by way of limitation, as embodiments of the present invention can be incorporated in other types of systems. For example, other such systems could incorporate less or more network elements into the network ring and/or network elements attached thereto. Moreover, embodiments of the present invention are not limited to the network ring architecture as illustrated in FIG. 1. Examples of other types of network architectures that can incorporate embodiments of the present invention include, but are not limited to, a point-to-point configuration, point-to-multipoint configuration and/or a hub configuration. In addition, embodiments of the present invention are not limited to TDM networks, but also applies to Wave Division Multiplexing (WDM) networks.

Network Element Description

Figure 2:
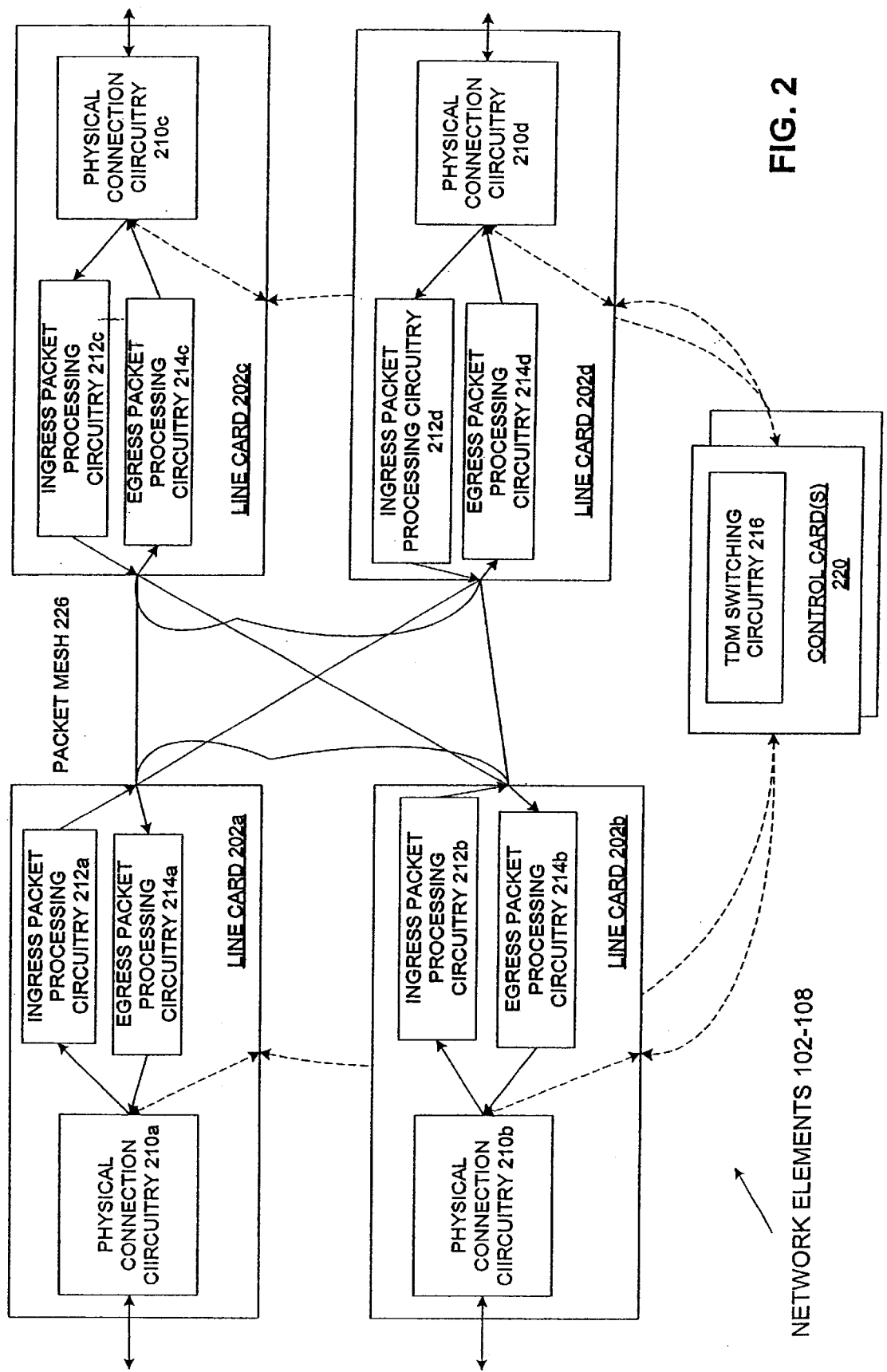
FIG. 2 illustrates portions of in-ring network elements 102–108, according to embodiments of the present invention.

FIG. 2 illustrates portions of in-ring network elements 102–108 (for purposes of FIG. 2, hereinafter "network element 102"), according to embodiments of the present invention. As shown, network element 102 includes line cards 202a–d and control card(s) 220, such that control card(s) 220 are coupled to each of line cards 202a–d. The number of line cards illustrated are for the sake of simplicity and not by way of limitation, as a lesser or greater number of line cards can be included within network element 102. Additionally, network element 102 includes a first switch fabric, packet mesh 226, which includes a full mesh such that each of line cards 202a–d are coupled to one another. For example, line card 202a is coupled to line cards 202b–d through packet mesh 226. However, embodiments of the present invention are not limited to a fall mesh for the transmission of packets among line cards 202a–d, as any type of switching method that switches based on the addressing scheme described herein can be incorporated into embodiments of the present invention. For example, in one embodiment, line cards 202a–d could be coupled together using a switch fabric, such that the line cards are coupled to a control card, which provides for the switching therein.

Line cards 202a–d include physical connection circuitry 210a–d, ingress packet processing circuitry 212a–d and egress packet processing 214a–d, respectively. Physical connection circuitry 210a–d can be coupled to lines external to network element 102, as shown, which can carry optical and/or electrical signals, which is described in more detail below in conjunction with FIG. 7. In one embodiment, line cards 202a–d of network element 102 may be connected to an optical line transmitting SONET OC-N signals. Moreover, in an embodiment, line cards 202a–d of network element 102 may be connected to an electrical line such as a T1, T3, E1, E3, Ethernet, Gigabit Ethernet, etc. However, embodiments of the present invention are not limited to the above-described examples, as any other type of optical or electrical data transmission can be incorporated into embodiments of the present invention. Additionally, control cards(s) 220 include TDM switching circuitry 216.

In an embodiment, each line card 202a–d can be coupled to four optical and/or electrical lines. In another embodiment, each line card 202a–d can be coupled to eight optical and/or electrical lines. However, embodiments of the present invention are not so limited, as a lesser or greater number of optical and/or electrical lines can be coupled to network element 102 through line cards 202a–d. Additionally, physical connection circuitry 210a–d are coupled to ingress packet processing circuitry 212a–d, respectively, such that packet data being received from the optical and/or electrical lines is passed from physical connection circuitry 210a–d to ingress packet processing circuitry 212a–d, respectively. In one embodiment, the packet data is extracted from a TDM signal, which is described in more detail below.

Ingress packet processing circuitry 212a–d is coupled to packet mesh 226. Accordingly, each ingress packet processing circuitry 212a–d is coupled to each egress packet processing circuitry 214a–d, respectively, on other line cards 202a–d through packet mesh 226. Moreover, egress packet processing circuitry 214a–d is respectively coupled to physical connection circuitry 210a–d, such that packet data traffic coming in from packet mesh 226 from ingress packet processing circuitry 212a–d is transmitted from egress packet processing circuitry 214a–d to physical connection circuitry 210a–d, respectively.

Line cards incorporated into embodiments of the present invention are not limited to those illustrated by line cards 202a–d. Moreover, the network elements can have different line card configurations from that shown by line cards 202a–d. For example, a given in-ring network element could be limited to a single line card that can receive and transmit TDM traffic (which may include packet traffic) within network ring 114, employing multiple interfaces for the receipt and transmittal of TDM traffic. In another embodiment, a given in-ring network element can include a first line card to receive TDM traffic (which may include packet traffic) from another in-ring element, while a second line card can transmit TDM traffic to another or same in-ring network element. In one such embodiment, a third line card can be incorporated into this given in-ring network element to add, drop and transmit different types of traffic including different types of packet traffic, such as ATM, Frame Relay, IP, etc, received and transmitted to a non-ring network element. In another embodiment, a given network element may include a single line card with multiple interfaces such that a first interface receives TDM traffic from another in-ring network element, a second interface transmits TDM traffic to another in-ring network element and a third interface adds, drops and transmits traffic, such as packet traffic to a non-ring network element.

Accordingly, a line card is used either to connect to an in-ring network element to form part of the ring, or to provide communication with out-of ring network elements. To provide some examples with regard to a line card connected with an out-of-ring network element: 1) layer 2/3 traffic from out-of-ring network element can come in, go through the packet mesh to a line card connected to an in-ring network element, and then out onto the ring being carried by a SONET frame; 2) layer 2/3 traffic coming from an out-of-ring network element can be de-mapped into SONET, go through the TDM switch fabric to a line card connected to an in-ring network element, and then out onto the ring being carried by a SONET frame; 3) TDM traffic coming from an out-of-ring network element can come in, go through the TDM switch fabric to a line card connected to an in-ring network element, and then out onto the ring being carried by a SONET frame; 4) TDM traffic carrying layer 2/3 traffic can be processed to extract the layer 2/3 traffic, with the layer 2/3 traffic going through the packet mesh to a line card connected to an in-ring network element, and then out onto the ring carried by a SONET frame; layer 2/3 traffic coming form an out-of-ring network element can go through the packet mesh to an line card connected to an out-of-ring network element, and then go out of the ring being carried by the protocol of the interface of that egress line card; etc. With regard to the TDM traffic, a second switch fabric (in addition to packet mesh 226) is formed among line cards 202a–d and TDM switching circuitry 216 of control cards 220, as illustrated by the dashed lines in FIG. 2. In particular, physical connection circuitry 210a–d is coupled to TDM switching circuitry 216 for the receiving and transmitting of TDM traffic into and out of network element 102. Accordingly, TDM switching circuitry 216 receive TDM traffic from physical connection circuitry 210a–d and switches this traffic to any of physical connection circuitry 210a–d, based on configuration data for the timeslots of the TDM traffic. For example, TDM switching circuitry 216 could be configured such that data within the first ten timeslots of a TDM signal, such as a SONET/SDH signal, received on a first interface of physical connection circuitry 210a are forwarded out the first five timeslots of a TDM signal being transmitted out from a first interface of physical connection circuitry 210d.

Operation Of Physical Connection Circuitry 210

Figure 3:
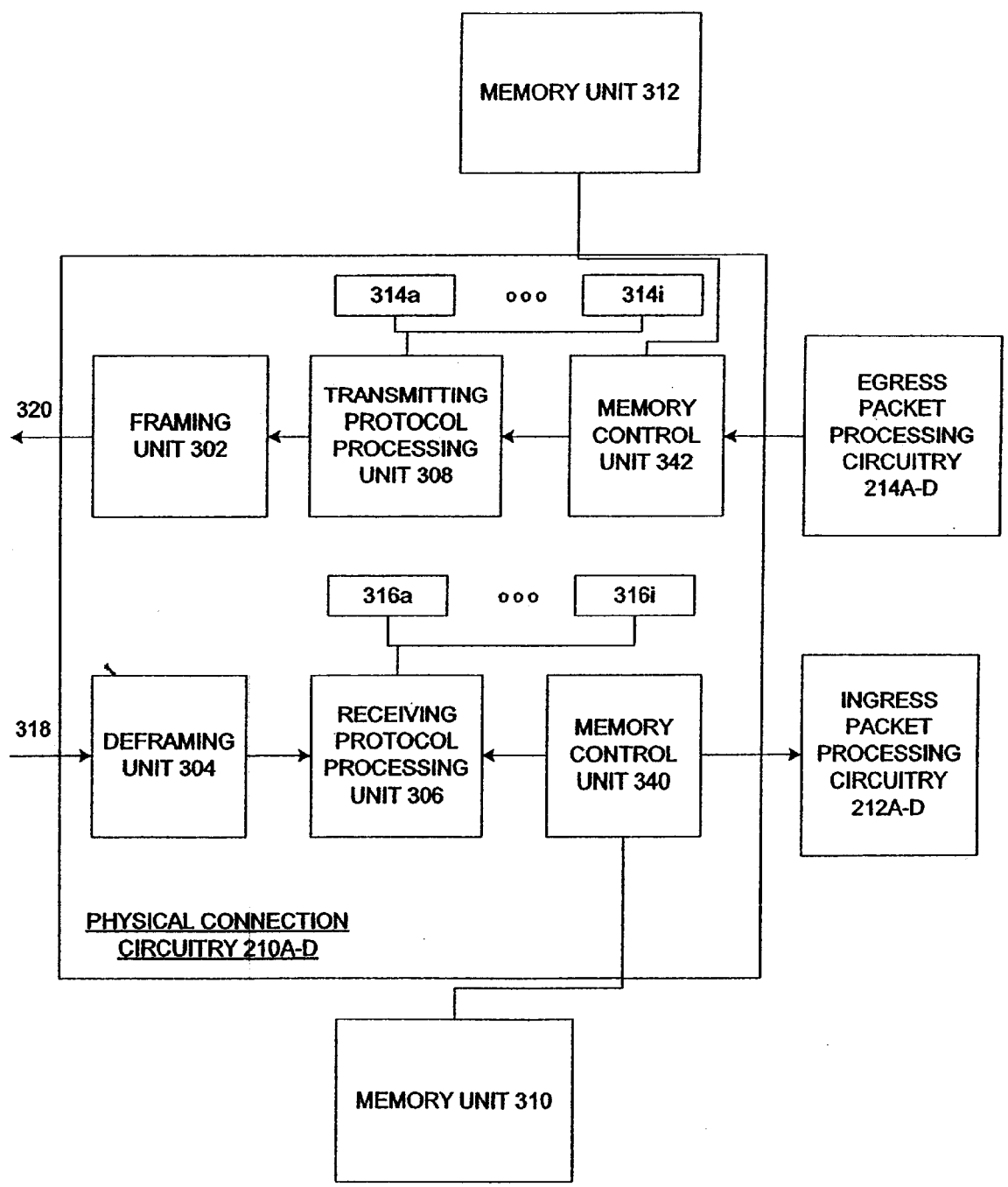
FIG. 3 is a block diagram of physical connection circuitry 210a–d, according to embodiments of the present invention.

FIG. 3 is a more detailed block diagram of physical connection circuitry 210a–d, according to embodiments of the present invention. In particular, physical connection circuitry 210a–d (hereinafter physical connection circuitry 210) includes framing unit 302, deframing unit 304, receiving protocol processing unit 306, transmitting protocol processing unit 308, register arrays 314a–i, register arrays 316a–i, memory control circuit 318 and memory control circuit 320. Additionally, memory control circuit 342 is coupled to memory unit 312, while memory control circuit 340 is coupled to memory unit 310. Memory control circuit 342 is also coupled to egress packet processing circuitry 214a–d (hereinafter egress packet processing circuitry 214), and memory control circuit 340 is coupled to ingress packet processing circuitry 212a–d (hereinafter ingress packet processing circuitry 212).

Memory units 310 and 312 can be any type of read/write memory. In an embodiment, memory units 310 and 312 are random access memories (RAMs). In one such embodiment, memory units 310 and 312 can be static RAMS. Register arrays 314a–i and register arrays 316a–i are also any type of read/write memory. In one embodiment, register arrays 314a–i and register arrays 316a–i are registers.

Deframing unit 304 is coupled to receive signal 318. Additionally, deframing unit 304 is coupled to receiving protocol processing unit 306, which is coupled to memory control unit 340 and register arrays 316a–i. Framing unit 302 is coupled to transmitting protocol processing unit 308, which is coupled to memory control unit 342 and register arrays 314a–i. Moreover, framing unit 302 transmits signal 320 out from physical connection circuitry 210.

Figure 4:
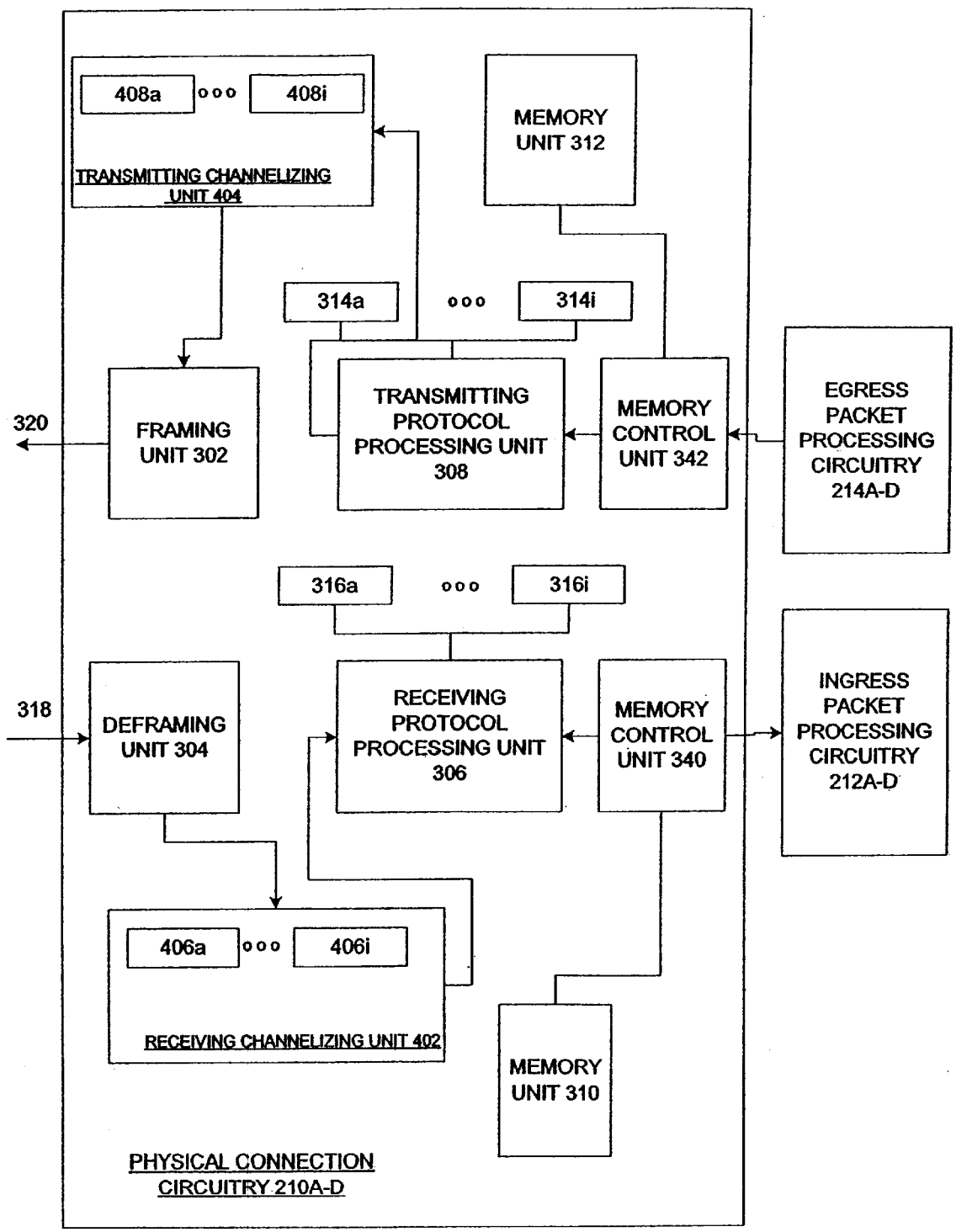
FIG. 4 is a more detailed block diagram of another embodiment of physical connection circuitry 210a–d, according to embodiments of the present invention.

FIG. 4 is a more detailed block diagram of another embodiment of physical connection circuitry 210a–d, according to embodiments of the present invention. Similar to the embodiment illustrated in FIG. 3, the embodiment of physical connection circuitry 210 illustrated in FIG. 4 includes framing unit 302, deframing unit 304, receiving protocol processing unit 306, transmitting protocol processing unit 308, register arrays 314a–i, register arrays 316a–i, memory control circuit 318 and memory control circuit 320. Additionally, physical connection circuitry 210 includes receiving channelizing unit 402 and transmitting channelizing unit 404. Receiving channelizing unit 402 includes buffers 406a–i, and transmitting channelizing unit 404 includes buffers 408a–i. Moreover, in contrast to the embodiment of FIG. 3, memory units 310–312 are internal to physical connection circuitry 210.

Memory control circuit 342 is coupled to memory unit 312, while memory control circuit 340 is coupled to memory unit 310. Memory control circuit 342 is also coupled to egress packet processing circuitry 214a–d (hereinafter egress packet processing circuitry 214), and memory control circuit 340 is coupled to ingress packet processing circuitry 212a–d (hereinafter ingress packet processing circuitry 212).

Memory units 310 and 312 can be any type of read/write memory. In an embodiment, memory units 310 and 312 are random access memories (RAMs). In one such embodiment, memory units 310 and 312 can be static RAMS. Register arrays 314a–i and register arrays 316a–i are also any type of read/write memory. In one embodiment, register arrays 314a–i and register arrays 316a–i are registers.

Deframing unit 304 is coupled to receive signal 318. Additionally, deframing unit 304 is coupled to receiving channelizing unit 402. Receiving channelizing unit 402 is coupled to receiving protocol processing unit 306, which is coupled to memory control unit 340 and register arrays 316a–i. Framing unit 302 is coupled to transmitting channelizing unit 404. Transmitting channelizing unit 404 is coupled to transmitting protocol processing unit 308, which is coupled to memory control unit 342 and register arrays 314a–i. Moreover, framing unit 302 transmits signal 320 out from physical connection circuitry 210. The operation of physical connection circuitry 210 will now be described in conjunction with FIGS. 5–8 below.

Processing of Data Packets Received

Figure 5:
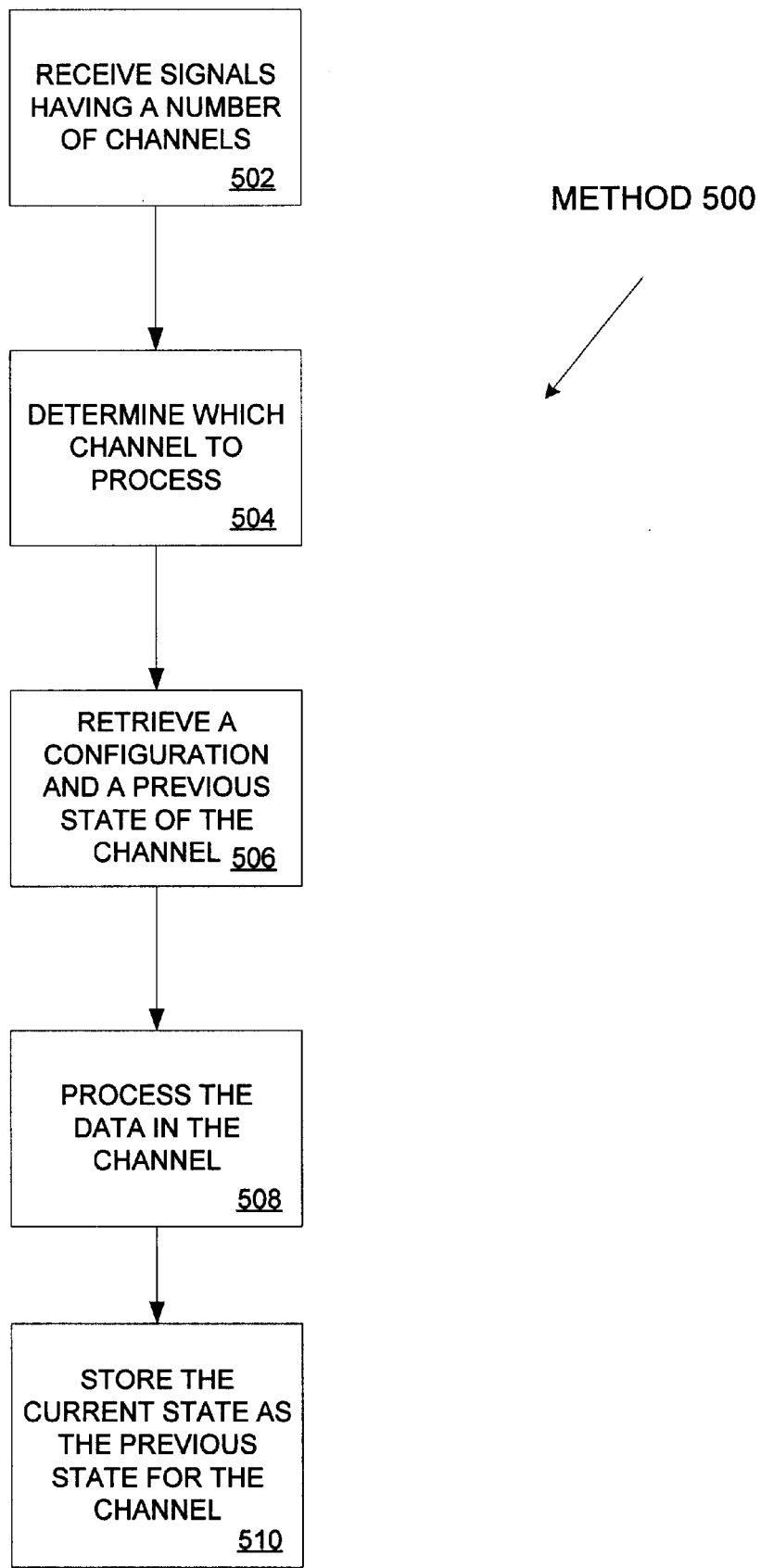
FIG. 5 illustrates a flowchart for the processing of data being received and transmitted from a network element, according to embodiments of the present invention.

FIG. 5 illustrates a flowchart for the processing of data being received into a network element, according to embodiments of the present invention. In particular, FIG. 5 includes method 500 that illustrates the processing of data packets received by receiving protocol processing unit 306. Method 500 commences with the receipt of a number of channels within signal 318, at process block 502. In an embodiment, the number of channels include portions of data packets. For the embodiment of physical connection circuitry 210 illustrated in FIG. 3, receiving protocol processing unit 306 receives these channels from deframer unit 304. In an embodiment, deframer unit 304 receives signal 318 from an external network element (not shown). Returning to FIG. 1 to help illustrate, physical connection circuitry 210 of FIG. 3 could be located within in-ring network element 102 to receive signal 318 from non-ring network element 110. Additionally, physical connection circuitry 210 of FIG. 3 could be located within in-ring network element 102 to receive signal 318 from in-ring network element 108.

For the embodiment of physical connection circuitry 210 illustrated in FIG. 4, receiving protocol processing unit 306 receives these channels from receiving channelizer unit 402. Receiving channelizer unit 402 receives the data for placement into these channels from deframer unit 304. In an embodiment, receiving channelizer unit 402 includes buffers 406a–i that are associated with the different channels to which the data can be placed. In an embodiment, the number of buffers is four. However, embodiments of the present invention are not so limited, as a lesser or greater number of buffers can be included within receiving channelizer unit 402. Additionally, in one embodiment, buffers 406a–i can associate a channel with a number of SONET frames, which is described in more detail below in conjunction with FIG. 8.

Figure 6:
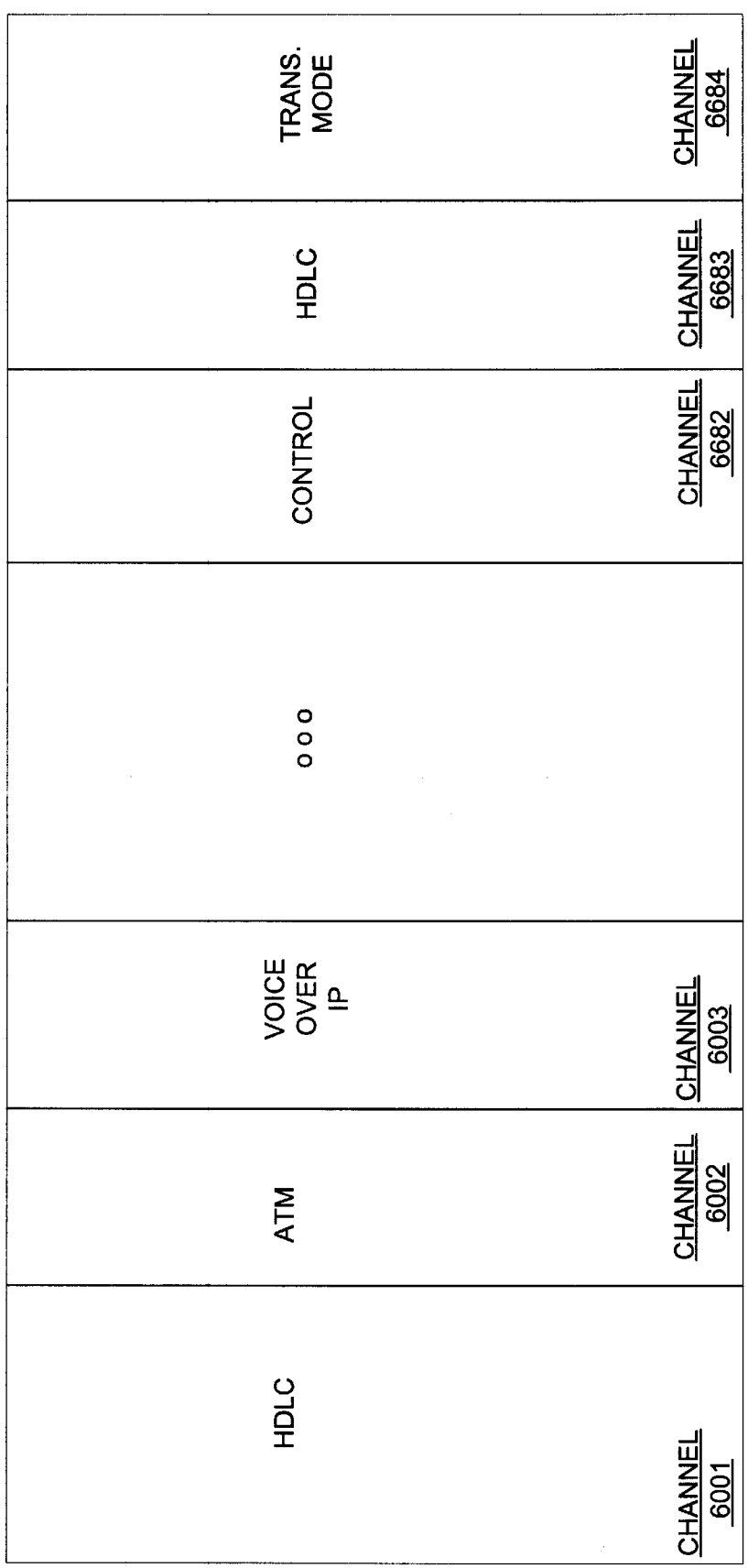
FIG. 6 illustrates a number of channelized DS-3 signals that are processed, according to embodiments of the present invention.

In an embodiment, signal 318 is based on the DS-3 standard. In another embodiment, signal 318 is based on the DS-1 standard. In one embodiment, signal 318 is comprised of a number of DS-3 signals. In one such embodiment, the number of DS-3 signals are included in a SONET/SDH signal. Additionally, in an embodiment, signal 318 is a channelized DS-3 signal. FIG. 6 illustrates one embodiment of a number of channelized DS-3 signals.

In particular, FIG. 6 illustrates a number of channelized DS-3 signals that are processed, according to embodiments of the present invention. In this embodiment, FIG. 6 illustrates 12 channelized DS-3 signals. FIG. 6 illustrates channelized DS-3 signals 601 that includes channel 6001, channel 6002, channel 6003 through channel 6682, channel 6683 and channel 6684. As illustrated, in an embodiment, channelized DS-3 signals 601 can include 684 channels. Moreover in one embodiment, each of these 684 channels can include a different protocol.

For channelized DS-3 signals 601, channel 6001 is configured to process data traffic having a High-level Data Link Control (HDLC) protocol, while channel 6002 is configured to process data traffic (i.e., data packets) having an Asynchronous Transfer Mode (ATM) protocol. Embodiments of the present invention can incorporate different types of the ATM protocol including but not limited to direct map, Physical Layer Convergence Protocol (PLCP) and ATM Adaptation Layer (AAL5). Additionally, channel 6003 is configured to process data traffic having a Voice over Internet Protocol (VoIP) protocol, while channel 6683 is configured to process data traffic having an HDLC protocol. The above-described protocols are by way of example and not by way of limitation, as other types of protocols can be incorporated into embodiments of the present invention. Moreover, channel 6684 illustrates another example of a mode, termed transparent mode, that data can be in for processing by receiving protocol processing unit 306. In particular, in an embodiment, a channel may not be associated with a protocol. Accordingly, receiving protocol processing unit 306 forwards the data as a number of bits, independent of a protocol.

Channel 6682 illustrates another type of data that can be transmitted within a channel of channelized DS-3 signals 601. In particular, channel 6682 transmits control data. In one such embodiment, this control data for a given control channel is associated with the DS-3 signal or one of the 28 DS-1s within the DS-3 channel. Accordingly in one such embodiment, one channelized DS-3 signal can include 29 channels carrying control data (i.e., control channels), which includes a control channel for the channelized DS-3 signals and a control channel for each of the 28 DS-1 signals. In an embodiment, a control channel is a maintenance data link (MDL) channel, as is known in the art. In another embodiment, a control channel is a facility data link (FDL) channel, as is known in the art.

In one embodiment, these different control channels being processed within physical connection circuitry 210 employ the HDLC protocol. In another embodiment, these different control channels being processed within physical connection circuitry 210 employ the transparent mode. However, embodiments of the present invention are limited to the employment of the HDLC protocol or the transparent mode for use in these different control channels, as other types of protocols can be incorporated for the usage in these control channels.

Additionally, while channels in channelized DS-3 signals 601 can have a same protocol, such channels can have different configurations for such a protocol. For example, channel 6001 and channel 6683 both carry High-level Data Link Control (HDLC) traffic. However, the configuration for HDLC for channel 6001 can be different than the configuration for HDLC for channel 6683. For example, as is known in the art, HDLC can support different scrambling modes, such as Asynchronous Transfer Mode (ATM) type scrambling and Larscom scrambling. According, the configuration for channel 6001 could include an ATM type scrambling, while the configuration for channel 6683 could include Larscom scrambling. Embodiments of the present invention are described in terms of a DS-3 or DS-1 signal. However, this is by way of example and not by way of limitation, as other types of signals carrying multiple protocols can be incorporated into embodiments of the present invention.

Channelized DS-3 signals 601, which are being processed by embodiments of the present invention, are by way of example and not by way of limitation, as other types of signals in other types of configurations can be incorporated into embodiments of the present invention. For example, in another embodiment, if there are a number of DS-3 signals, portions of these DS-3 signals may be channelized while the others may be unchannelized. Accordingly, the number of channels to be processed can vary depending on the type and number of incoming signals as well as the configuration of such signal(s).

To help illustrate, if the signal included 12 unchannelized DS-3 signals, the number of channels to be processed would be 24, which would include 12 data channels for each of the unchannelized DS-3 signals and 12 maintenance data link (MDL) control channels for each of the unchannelized DS-3 signals. To further illustrate, if the signal included six unchannelized DS-3 signals and six channelized DS-3 signals, the number of channels to be processed would include (1) six data channels and six control channels for the six unchannelized DS-3 signals and (2) 168 data channels for the DS-1 data channels and 168 Facility Data Link (FDL) control channels for the DS-1s and 6 MDL control channels for the DS-3s.

Upon receipt of signal 318, deframer unit 304 removes the data from the payload of the different frames of signal 318. Subsequently, for the embodiment of physical connection circuitry 210 illustrated in FIG. 3, deframer unit 304 forwards this data to receiving protocol processing unit 306, which receives the data, at process block 502. For the embodiment of physical connection circuitry 210 illustrated in FIG. 4, deframer unit 304 forwards this data to receiving channelizer unit 402, which places the data into one of buffers 406a–i, which is associated with one of a number of a channels for processing by receiving protocol processing unit 306.

Receiving protocol processing unit 306 determines which channel to process within the signal, at process block 504. In an embodiment, receiving protocol processing unit 306 determines which channel to process based on a table stored in memory within physical connection circuitry 210 (not shown). Such a table sets the order of traversal of the different channels of the signal being received by receiving protocol processing unit 306. In another embodiment, receiving protocol processing unit 306 determines which channel to process based on a prioritization scheme that can be configured by a system administrator of the given network element. In another embodiment, this prioritization scheme can be configured based on the channel having the highest bandwidth. In one embodiment, receiving protocol processing unit 306 can dynamically order the processing of the different channels based on usage. To help illustrate, the embodiment of physical connection circuitry 210 illustrated in FIG. 4 will process the channel for whose buffer is more full in comparison to the other buffers within receiving channelizer unit 402.

In one embodiment, the channels are traversed in sequential order starting with channel 6001 up through channel 6684. In another embodiment, the channels are prioritized such that certain channels are processed more frequently in comparison to other channels within the signal being received by receiving protocol processing unit 306. For example, control channels typically are not required to be serviced as frequently in comparison to channels carrying data. Accordingly, channels 6001–6003 and 6683–6684 are serviced by receiving protocol processing unit 306 more frequently in comparison to channel 6682. The above embodiments of the order of traversal are by way of example and not by way of limitation, as any other type of order of traversal may be incorporated into embodiments of the present invention.

As illustrated, receiving protocol processing unit 306 can service or process all of the channels within signal 318 prior to reservicing or reprocessing a channel again. Accordingly, receiving protocol processing unit 306 is operating at a frequency that is higher that the bandwidth of the incoming signal in order to process all of the channels therein. In an embodiment, signal 318 can be 12 DS-3 signals, such that each DS-3 signal is operating at approximately 44.35 Megabits/second (Mbits/sec). Signal 318 is, therefore, operating at approximately 532.2. Megabits/second. In an embodiment, receiving protocol processing unit 306 is operating at a frequency higher than approximately 532.2 Mbits/sec. In one such embodiment, receiving protocol processing unit 306 is operating at approximately 800 Mbits/sec, which is higher than the operating frequency of 12 DS-3 signals.

Upon determining which channel to process, receiving protocol processing unit 306 retrieves the configuration and the previous state of this channel, at process block 506. In an embodiment, physical connection circuitry 210 includes a storage space associated with each channel within signal 318. Accordingly, in an embodiment wherein signal 318 includes 12 DS-3 signals, physical connection circuitry 210 includes storage space for 684 channels. Returning to FIG. 3, in an embodiment, this storage space is provided by register arrays 316a–i such that each of these register arrays is associated with a channel within the signal being received. However, embodiments of the present invention are not so limited, as the configuration and previous state of the different channels can be stored in other configurations and/or other memory devices. For example, in another embodiment, the configurations and previous states for the different channels can be stored in one memory location on physical connection circuitry 210. Moreover, in another embodiment, the configurations and previous states for the different channels can be stored in a memory device external to physical connection circuitry 210. Additionally, in another embodiment, the configuration and the previous state for a channel can be stored in separate memory locations.

Once the configuration and the previous state for the selected channel has been retrieved, receiving protocol processing unit 306 processes the data in the selected channel based on the configuration and the previous state, at process block 508. In an embodiment, the configuration includes whether the channel is enabled, the type of protocol as well as the configurations associated with this protocol for the given channel. For example, for the HDLC protocol, configurations could include whether to enable scrambling as well as the type of scrambling that is enabled (e.g., ATM type scrambling, Larscom scrambling, digital link, Kentrox, etc.).

Additionally, in an embodiment, the previous state for the selected channel includes previous data received from the channel. In an embodiment, receiving protocol processing unit 306 receives and processes one byte for a given channel. Accordingly, receiving protocol processing unit 306 stores a number of previously received bytes for this channel. The number of bytes stored for a given channel is dependent on the protocol associated with this channel.

To help illustrate, for the HDLC protocol, receiving protocol processing unit 306 can perform bit "destuffing" upon receipt of a given bit combination, as is known in the art. In one embodiment, a bit combination of '0111110' indicates that bit "destuffing" for the HDLC protocol is required. However, this bit combination may be across two different bytes received by receiving protocol processing unit 306. Accordingly, in an embodiment for the HDLC protocol, receiving protocol processing unit 306 stores a previous byte as part of the previous state for the channel. For example, a previous byte stored in the previous state could include the bit combination of '00101001' while the current byte being received could include the bit combination of '11110101'. The last two bits of the previous byte in conjunction with the first six bits of the current byte include the bit combination '0111110', thereby indicating that bit "destuffing" for the HDLC protocol is required.

However, embodiments of the present invention are not limited to the storage of a single previous byte in the previous state, as different protocols may be more demanding in the number of bytes needed to determine relevant information for the given protocol. For example, for the ATM protocol the previous four bytes are stored in the previous state in order to generate the Header Error Check (HEC) for the ATM cells, as is known in the art. In an embodiment, the size of register arrays 316a–i are large enough to accommodate the most demanding protocol.

Additionally, receiving protocol processing unit 306 forwards the data for the given channel as part of a packet, such as an ATM cell to memory control circuit 340, which stores this data into memory unit 310. Accordingly, ingress packet processing circuitry 216 retrieves these processed packets from memory unit 310 through memory control unit 340.

The above description of the processing of a channel within signal 318 is by way of example and not by way of limitation, as different protocols require different configurations and calculations, thereby requiring the storage of different types and sizes of the previous states for the different channels.

In addition to processing the data in the given channel, receiving protocol processing unit 306 stores the current state as the previous state for the processed channel within register arrays 316a–i, at process block 510. As described above, the current state can include a number of different bytes depending on the type of protocol and protocol configuration.

Processing of Data Packets Transmitted

Figure 7:
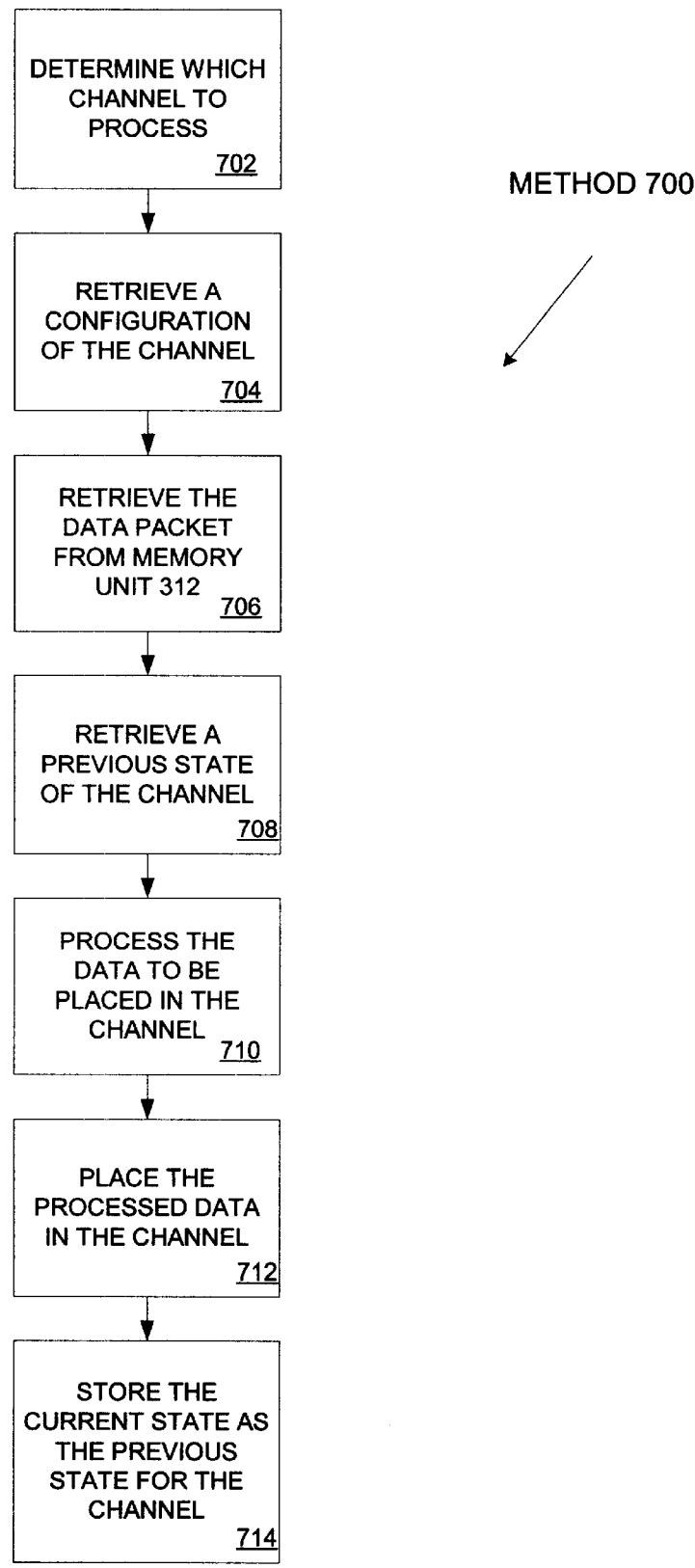
FIG. 7 illustrates a flowchart for the processing of data being transmitted out from a network element, according to embodiments of the present invention.

FIG. 7 illustrates a flowchart for the processing of data being transmitted out from a network element, according to embodiments of the present invention. In particular, FIG. 7 includes method 700 that illustrates the processing of data packets received by transmitting protocol processing unit 308 that are stored in memory unit 312. In an embodiment, such data packets that are stored in memory unit 312 are being received from egress packet processing circuitry 214a–d. Method 700 commences with determining which channel of signal 320 is to be processed, at process block 702. Similar to receiving protocol processing unit 306, in an embodiment, transmitting protocol processing unit 308 determines which channel to process based on a table stored in memory within physical connection circuitry 210 (not shown) or a prioritization scheme. Such a table sets the order of traversal of the different channels of signal 320.

Returning to FIG. 6 to help illustrate, in one embodiment, the channels are traversed in sequential order starting with channel 6001 up through channel 6684. In another embodiment, the channels are prioritized such that certain channels are processed more frequently in comparison to other channels within signal 320. For example, control channels typically are not required to be serviced as frequently in comparison to channels carrying data. Accordingly, channels 6001–6003 and 6683–6684 are serviced by transmitting protocol processing unit 308 more frequently in comparison to channel 6682. The above embodiments of the order of traversal are by way of example and not by way of limitation, as any other type of order of traversal may be incorporated into embodiments of the present invention.

Additionally, transmitting protocol processing unit 308 retrieves the configuration for the selected channel, at process block 704. As described above, each channel can include a different configuration for a different and/or same protocol. For example, in an embodiment, a first channel can be an ATM protocol wherein ATM-type scrambling for the channel is enabled, while a second channel can also be a ATM protocol wherein a Larscom scrambling for the channel is enabled.

Moreover, transmitting protocol processing unit 308 retrieves at least a portion of a data packet that is to be transmitted on the selected channel, at process block 706. In one embodiment, for given protocols, transmitting protocol processing unit 308 delays the retrieval of portions of a data packet until a threshold amount of the entire data packet has been stored in memory unit 312. For example, for data packets having an ATM protocol, transmitting protocol processing unit 308 delays the retrieval of a portion of data for a given ATM cell until a threshold portion of the payload has been stored in memory unit 312 by egress packet processing circuitry 214a–d. Moreover, in an embodiment, if a given channel is based on the ATM protocol and the amount of data for the next ATM cell to be transmitted has not exceeded the threshold for this channel, transmitting protocol processing unit 308 forwards an idle ATM cell to framing unit 302.

In one embodiment, transmitting protocol processing unit 308 checks this threshold amount for the entire data packet for the first portion of the data packet being processed by transmitting protocol processing unit 308. However, embodiments of the present invention are not so limited, as certain data packets may contain multiple data cells, depending on the protocol and protocol configuration. For example, in an embodiment, a channel transmitting an ATM protocol may be transmitting a data packet that can contain more than a single ATM cell therein. In one such embodiment, transmitting protocol processing unit 308 checks if the threshold value for an ATM cell within a given data packet and not just the entire data packet for a given ATM cell has been reached prior to the transmission of the ATM cell to framing unit 302.

In one embodiment, each of the different protocols as well as each of the different channels of a same protocol can configure this threshold value. Embodiments of the present invention are not limited to the transmission of a idle cell if the data is not complete, as described in conjunction with the ATM protocol above. For example, in an embodiment of the voice over IP protocol, transmitting protocol processing unit 308 can retransmit the previous packet for the given channel. Additionally, in an embodiment, if a threshold value for a given protocol and protocol configuration has not been achieved but the completed packet has been stored in memory unit 312, transmitting protocol processing unit 308 proceeds with the processing of this packet to send to framing unit 302. Accordingly, this checking of threshold values by transmitting protocol processing unit 308 precludes underrunning, which is condition wherein transmitting protocol processing unit 308 does not have enough of a data packet to complete the transmission of the entire data packet to framing unit 302.

Moreover, upon determining which channel to process, transmitting protocol processing unit 308 retrieves the previous state of this channel, at process block 708. In an embodiment, physical connection circuitry 210 includes a storage space associated with each channel within signal 320. Accordingly, in an embodiment wherein signal 320 includes 12 DS-3 signals, physical connection circuitry 210 includes storage space for 684 channels. In one such embodiment, these 684 channels can be for 336 DS-1 data channels and 348 control channels related to the 336 DS-1 data channels and 12 DS-3 data channels.

Returning to FIG. 3, in an embodiment, this storage space is provided by register arrays 314a–i such that each of these data arrays is associated with a channel within the signal being received. However, embodiments of the present invention are not so limited, as the previous state of the different channels can be stored in other configurations and/or other memory devices. For example, in another embodiment, the previous states for the different channels can be stored in one memory location on physical connection circuitry 210. Moreover, in another embodiment, the previous states for the different channels can be stored in a memory device external to physical connection circuitry 210.

Once the previous state for the selected channel has been retrieved, transmitting protocol processing unit 308 processes the data in the selected channel based on the previous state, at process block 710. In one embodiment, the processing of the data for this given channel includes encapsulating the data into a particular protocol, such as ATM, HDLC, or Voice over IP. Moreover, in an embodiment, the previous state includes whether the channel is enabled, the type of protocol as well as the configurations associated with this protocol for the given channel. For example, for the HDLC protocol, configurations could include whether to enable scrambling as well as the type of scrambling that is enabled (e.g., ATM type scrambling, Larscom scrambling, digital link, Kentrox, etc.).

Additionally, in an embodiment, the previous state for the selected channel includes previous data received for the channel. In an embodiment, transmitting protocol processing unit 308 retrieves and processes one byte for a given channel. Accordingly, transmitting protocol processing unit 308 stores a number of previously received bytes for this channel. The number of bytes stored for a given channel is dependent on the protocol associated with this channel. To help illustrate, for the HDLC protocol, transmitting protocol processing unit 308 determines whether to perform bit stuffing so that five consecutive "1"s are not inserted into the bit stream for the payload of an HLDC .packet. Accordingly, because this five bit combination "11111" can be across two consecutive bytes being process by transmitting protocol processing unit 308, the previous byte is stored as check for the possible need of bit stuffing. This byte can be stored in the associated register array 314a–i, which is part of the previous state for the given channel.

In addition to processing the data in the given channel, transmitting protocol processing unit 308 stores the current state as the previous state for the processed channel within register arrays 314a–i, at process block 710. As described above, the current state can include a number of different bytes depending on the type of protocol and protocol configuration.

For the embodiment of physical connection circuitry 210 illustrated in FIG. 3, transmitting protocol processing unit 308 forwards this packet data to the framing unit 302, which places the packet data for the given channel into signal 320. For the embodiment of physical connection circuitry 210 illustrated in FIG. 4, transmitting protocol processing unit 308 forwards this packet data to the buffer of buffers 408a–i associated with the given channel within transmitting channelizing unit 404. Transmitting channelizing unit 404 forwards the packet data to framing unit 302, which places the packet data for the given channel into signal 320.

The description of the different protocols and configurations are by way of example and not by way of limitation, as other types of protocols along with different configurations can be incorporated into embodiments of the present invention. For example, embodiments of the present invention can incorporate a Frame Relay protocol and various configurations thereof.

Embodiments of the present invention are not limited to the channelized DS-3 signals, as illustrated in FIG. 6. In particular, embodiments of the present invention can be incorporated into channelized DS-1 signals, unchannelized DS-3 signals, unchannelized DS-1 signals as well as both channelized and unchannelized T1 and T3 signals. Further, in one embodiment, physical connection circuitry 210 is incorporated into a single Application Specific Integrated Circuit (ASIC).

Moreover, embodiments of the present invention were described in terms of the processing of a DS-3 and/or DS-1 signals. However, embodiments of the present invention are not so limited, as other type of signals can be processed according to embodiments of the present invention. For example, signals based on the SONET/SDH standard can be incorporated into embodiments of the present invention. In particular, signals based on the SONET/SDH standard can concatenate Synchronous Transport Signal (STS)-1 frames such that different STS-1 frames and/or the different concatenation of STS-1 frames can be processed by physical connection circuitry 210 differently as described above.

To help illustrate, FIG. 8 is a block diagram of a SONET signal carrying data, according to embodiments of the present invention. In particular, FIG. 8 illustrates a OC-48 SONET signal, which could be transmitted among in-ring network elements 102–108 of FIG. 1. As shown, the 48 frames of this OC-48 signal are apportioned into different groups. In particular, data traffic within this OC-48 signal is located in STSI-9, STS10–11, STS12–21, STS22–23, STS24–35, STS36–37, STS38–44, STS45–46 and STS47–48 within SONET portions 802, 804, 806, 808, 810, 812, 814, 816 and 818, respectively. Accordingly, each of the groups of STS frames are concatenated together. For example, STS frames 24–35 are concatenated together. In an embodiment, the concatenation of STS frames within the SONET/SDH signals can be of any size and across any location within the SONET/SDH signals, which is described in more detail in a patent application titled "Any Size and Location of Concatenated Packet Data across TDM frames in a TDM signal" to Anurag Nigam and David Stiles, filed on Dec. 30, 2000, Ser. No. 09/751,764 Unassigned, Attorney Docket Number: 004906.P014, which is hereby incorporated by reference.

Therefore, each of the individual frames of the SONET/SDH signals and/or concatenation of frames of the SONET/SDH signal can be processed by physical connection circuitry 210 such that each frame and/or concatenation includes a different protocol and/or protocol configuration, as described above in conjunction with the DS-1/DS-3 signals. For example, SONET portion 802 could be configured to process an ATM protocol having a first set of configurations, while SONET portion 804 could be configured to process a Frame Relay protocol having a first set of configurations. Additionally, SONET portion 806 could be configured to process a voice over IP protocol having a first set of configurations, while SONET portion 808 could be configured to process a PPP protocol having a first set of configurations. Moreover, SONET portion 810 could be configured to process an IP protocol having a first set of configurations, while SONET portion 812 could be configured to process a Frame Relay protocol having a second set of configurations. SONET portion 814 could be configured to process an IP protocol having a second set of configurations, while SONET 816 could be configured to process an ATM protocol having a second set of configurations. Moreover, SONET portion 818 could be configured to process a Frame Relay protocol having a third set of configurations.

The delineation and configuration of the SONET signal illustrated in FIG. 8 is by way of example and not by way of limitation, as other SONET signals wherein the STS or OC frames are delineated differently and/or the types of protocols and/or configurations incorporated into such delineations are different. Moreover, embodiments of the present invention are not limited to a DS-1, DS-3, T1, T3 or SONET-based signals. In particular, any type of data transmission signal that can be broken down into different portions such that these portions can be processed differently depending on the different protocols and/or protocol configurations.

The line cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for processing data packets of differing protocols across different data channels and control channels within signals have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
receiving at least one data signal, wherein the at least one data signal includes a number of channels, wherein the number of channels includes data channels and control channels, such that each of the data channels can include different protocols and different configurations for the different protocols and such that the control channels includes control data for controlling the at least one data signal; and
processing data packets in each of the number of channels in a predefined order.

2. The method of claim 1, wherein a same processing element processes the data packets.

3. The method of claim 1, wherein the same processing element is an Application Specific Integrated Circuit.

4. The method of claim 1, wherein the predefined order is sequential.

5. The method of claim 1, wherein the predefined order is such that data packets within a first channel of the number of channels is processed more frequently than data packets within a second channel of the number of channels.

6. The method of claim 1, wherein the different protocols are selected from a group consisting of Asynchronous Transfer Mode, HDLC and Voice over Internet Protocol.

7. The method of claim 1, wherein the at least one data signal includes a Data Signal (DS)-3 signal and wherein the control channels include a maintenance data link (MDL) channel.

8. The method of claim 1, wherein the at least one data signal includes a Data Signal (DS)-1 signal and wherein the control channels include a facility data link (FDL) channel.

9. A method comprising:
receiving data packets within a number of data channels of a signal;
receiving data packets within a number of control channels in the signal; and
processing the data packets within the number of data channels and the number of control channels in an order, wherein the processing of a channel of the number of data and control channels includes:
retrieving a previous state of the channel;
retrieving configuration data of the channel;
determining a protocol of the channel based on the configuration data;
determining a configuration of the protocol of the channel based on the configuration data;
processing a protocol header of the data packet in the channel based on the protocol and the configuration of the protocol; and
saving the current state of the channel as the previous state of the channel.

10. The method of claim 9, wherein a same processing element processes the data packets.

11. The method of claim 9, wherein the same processing element is an Application Specific Integrated Circuit.

12. The method of claim 9, wherein the predefined order is sequential.

13. The method of claim 9, wherein the predefined order is such that data packets within a first channel of the number of channels is processed more frequently than data packets within a second channel of the number of channels.

14. The method of claim 9, wherein the different protocols are selected from a group consisting of Asynchronous Transfer Mode, HDLC and Voice over Internet Protocol.

15. The method of claim 9, wherein the at least one data signal includes a Data Signal (DS)-3 signal and wherein the control channels include a maintenance data link (MDL) channel.

16. The method of claim 9, wherein the at least one data signal includes a Data Signal (DS)-1 signal and wherein the control channels include a facility data link (FDL) channel.

17. An apparatus comprising:
a first memory unit to store a number of data packets received on at least one receiving signal from at least one external apparatus, wherein the at least one receiving channel includes a number of data channels and a number of control channels;
a second memory unit to store a number of data packets to be transmitted on at least one transmitting signal to the at least one external apparatus, wherein the at least one transmitting signal includes a number of data channels and control channels;
a number of register arrays coupled to the first and second memory units, each of the number of register arrays to store a configuration and a previous state of one of the number of data channels and control channels within the at least one receiving signal and the at least one transmitting signal;
a receiving packet processing unit coupled to the number of register arrays and the first memory unit, the receiving packet processing unit to receive and process portions of data packets from the number of channels of the at least one receiving signal, wherein the number of data and control channels of the at least one receiving signal can include different protocols and different configurations of the different protocols; and
a transmitting packet processing unit coupled to the number of register arrays and the second memory unit, the transmitting packet processing unit to receive portions of data packets from the second memory unit and to place the portions of the data packets into a number of data and control channels of the at least one transmitting signal, wherein the number of data and control channels of the at least one transmitting signal can include different protocols and different configurations of the different protocols.

18. The apparatus of claim 17, wherein the apparatus is within a single Application Specific Integrated Circuit.

19. The apparatus of claim 17, wherein receiving protocol processing unit processes portions of the data packets from the number of channels of the at least one receiving signal in an order.

20. The apparatus of claim 19, wherein the order is sequential.

21. The apparatus of claim 19, wherein the order is such that data packets within a first channel of the number of channels is processed more frequently than data packets within a second channel of the number of channels.

22. The apparatus of claim 17, wherein the different protocols are selected from a group consisting of Asynchronous Transfer Mode, HDLC and Voice over Internet Protocol.

23. The apparatus of claim 17, wherein the at least one receiving signal and the at least one transmitting signal includes a Data Signal (DS)-3 signal and wherein the control channels include a maintenance data link (MDL) channel.

24. The apparatus of claim 17, wherein the at least one receiving signal and the at least one transmitting signal includes a Data Signal (DS)-1 signal and wherein the control channels include a facility data link (FDL) channel.

25. A machine-readable medium that provides instructions, which when executed by a machine, cause said machine to perform operations comprising:

receiving at least one data signal, wherein the at least one data signal includes a number of channels, wherein the number of channels includes data channels and control channels, such that each of the data channels can include different protocols and different configurations for the different protocols and such that the control channels includes control data for controlling the at least one data signal; and processing data packets in each of the number of channels in a predefined order.

26. The machine-readable medium of claim 25, wherein a same processing element processes the data packets.

27. The machine-readable medium of claim 25, wherein the same processing element is Application Specific Integrated Circuit.

28. The machine-readable medium of claim 25, wherein the predefined order is sequential.

29. The machine-readable medium of claim 25, wherein the predefined order is such that data packets within a first channel of the number of channels is processed more frequently than data packets within a second channel of the number of channels.

30. The machine-readable medium of claim 25, wherein the different protocols are selected from a group consisting of Asynchronous Transfer Mode, HDLC and Voice over Internet Protocol.

31. The machine-readable medium of claim 25, wherein the at least one data signal includes a Data Signal (DS)-3 signal and wherein the control channels include a maintenance data link (MDL) channel.

32. The machine-readable medium of claim 25, wherein the at least one data signal includes a Data Signal (DS)-1 signal and wherein the control channels include a facility data link (FDL) channel.

33. A machine-readable medium that provides instructions, which when executed by a machine, cause said machine to perform operations comprising:

receiving data packets within a number of data channels of a signal;

receiving data packets within a number of control channels in the signal; and processing the data packets within the number of data channels and the number of control channels in an order, wherein the processing of a channel of the number of data and control channels includes:

retrieving a previous state of the channel;

retrieving configuration data of the channel;

determining a protocol of the channel based on the configuration data;

determining a configuration of the protocol of the channel based on the configuration data;

processing a protocol header of the data packet in the channel based on the protocol and the configuration of the protocol; and saving the current state of the channel as the previous state of the channel.

34. The machine-readable medium of claim 33, wherein a same processing element processes the data packets.

35. The machine-readable medium of claim 33, wherein the same processing element is Application Specific Integrated Circuit.

36. The machine-readable medium of claim 33, wherein the predefined order is sequential.

37. The machine-readable medium of claim 33, wherein the predefined order is such that data packets within a first channel of the number of channels is processed more frequently than data packets within a second channel of the number of channels.

38. The machine-readable medium of claim 33, wherein the different protocols are selected from a group consisting of Asynchronous Transfer Mode, HDLC and Voice over Internet Protocol.

39. The machine-readable medium of claim 33, wherein the at least one data signal includes a Data Signal (DS)-3 signal and wherein the control channels include a maintenance data link (MDL) channel.

40. The machine-readable medium of claim 33, wherein the at least one data signal includes a Data Signal (DS)-1 signal and wherein the control channels include a facility data link (FDL) channel.

* * * * *

UNITED STATES PATENT AND TRADEMARK OFFICE
CERTIFICATE OF CORRECTION

PATENT NO. : 6,466,591 B1 Page 1 of 1
DATED : October 15, 2002
INVENTOR(S) : Ricky See, Felix Chow and Sharath Narahari It is certified that error appears in the above-identified patent and that said Letters Patent is hereby corrected as shown below:

<u>Title page,</u>
Item [75], Inventors, replace "Sharath Narahara, Pleasanton, CA (US)" with
-- "Sharath Narahari, Pleasanton, CA (US)" --

Signed and Sealed this

Ninth Day of March, 2004

JON W. DUDAS
*Acting Director of the United States Patent and Trademark Office*